United States Patent Office 3,519,718
Patented July 7, 1970

3,519,718
METHODS AND COMPOSITIONS FOR THE TREATMENT OF DEPRESSION WITH 11-AMINOALKYL 9,10-DIHYDRO-9,10 ETHANOANTHRACENE
Herbert Schroter, Fullinsdorf, and Daniel A. Prins, Oberwil, Switzerland, assignors to Geigy Chemical Corporation, Ardsley, N.Y., a corporation of New York
No Drawing. Continuation-in-part of application Ser. No. 405,273, Oct. 20, 1964. This application Aug. 21, 1968, Ser. No. 754,452
Claims priority, application Switzerland, Oct. 21, 1963, 12,919/63
Int. Cl. A61k 27/00
U.S. Cl. 424—330                                    16 Claims

ABSTRACT OF THE DISCLOSURE

Methods and compositions for the treatment of mental depression through the use of 11-aminoalkyl-9,10-dihydro-9,10-ethanoanthracene.

CROSS REFERENCE

This is a continuation-in-part of copending application Ser. No. 405,273, filed Oct. 20, 1964, now U.S. Pat. No. 3,422,104, issued Jan. 14, 1969.

DETAILED DESCRIPTION

The present invention relates to the treatment of mental depression through the use of a compound of the formula:

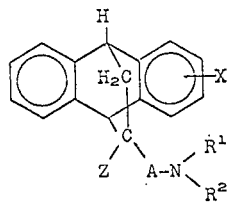

wherein

X is hydrogen, chloro, methoxy, methylthio or trifluoromethyl;
Z is hydrogen or methyl;
A is a straight or branched alkylene chain of from 1 to 5 carbon atoms; and
each of $R^1$ and $R^2$, taken separately is hydrogen or (lower) alkyl or $R^1$ and $R^2$, taken collectively together with the nitrogen atom to which they are attached, are pyrrolidino, piperidino, piperazino, N-(lower)alkylpiperazino, N - [hydroxy(lower)alkyl]piperazino or N-[(lower)alkoxy(lower)alkyl]piperazino, or a pharmaceutically acceptable nontoxic salt thereof.

In addition the present invention pertains to pharmaceutical compositions in unit dosage form adapted for the administration of such compounds to a depressed individual.

The compounds utilized in the method and compositions of the present invention can be synthesized according to the methods described in Ser. No. 405,273. Once obtained in a state of purity suitable for pharmaceutical usage, the compounds are incorporated in compositions suitable for oral or parenteral administration to animals in solid and liquid unit dosage forms, such as tablets, capsules, powders, granules, syrups, elixirs, solutions, suppositories and the like. The term unit dosage form as used in this specification and claims refers to physically discrete units suitable as unitary dosages for animals, each unit containing a predetermined quantity of active material calculated to produce the desired therapeutic effect in association with the required pharmaceutical diluent, carrier or vehicle.

Powders are prepared by comminuting a compound of this invention to a suitably fine size and mixing with a similarly comminuted diluent. The diluent can be an edible carbohydrate material such as starch. A sweetening agent or sugar may also be present as well as flavoring oil.

Granules for reconstitution into a liquid oral preparation are prepared utilizing water-soluble diluents. A powder mixture of the finely divided compound and a water-soluble diluent such as sucrose, glucose, and the like, is wetted with a binder such as acacia mucilage, gelatin solution, methylcellulose solution and forced through a screen to form granules which are allowed to dry. A suspending agent such as tragacanth may be included in the composition.

Capsules are made by preparing a powder mixture as described above and filling formed gelatin sheaths. As an adjuvant to the filling operation, a lubricant such as talc, magnesium stearate and calcium stearate may be added to the powder mixture before the filling operation.

Tablets are made by preparing a powder mixture, granulating or slugging, adding a lubricant and pressing into tablets. The powder mixture is prepared by mixing the compound, suitably comminuted, with a diluent or base which is a solid pulverulent carrier such as starch, e.g., potato starch, corn starch, amylopectin or the like; a carbohydrate such as sucrose, lactose, sorbitol, cellulose and the like; a protein such as gelatin; organic material such as talcum, kaolin or dicalcium phosphate and the like. The powder mixture can be granulated by wetting with a binder such as syrup, starch paste or acacia mucilage and forcing through a screen. As an alternative to granulating, the powder mixture can be slugged, i.e., run through the tablet machine and the resulting imperfectly formed tablets broken into pieces (slugs). The slugs can be lubricated to prevent sticking to the tablet forming dies by means of the addition of stearic acid, a stearate salt, talc, polyethylene oxides, or mineral oil. The lubricating mixture is then compressed into tablets. A protective coating consisting of a sealing coat of shellac, a coating of sugar and methylcellulose, and a polish coating of carnauba wax can be provided.

Oral fluids are prepared in unit dosage forms such as syrups and elixirs wherein each teaspoonful of composition contains a predetermined amount of the compound for administration.

A syrup is prepared by suspending the compound in a suitably flavored aqueous sucrose solution. Similarly, an elixir is prepared utilizing a nontoxic alcohol vehicle.

For parenteral administration, aqueous and oleaginous fluid unit dosage forms can be prepared. In preparing the parenteral form, a measured amount of the compound is placed in a vial, the vial and its contents sterilized and sealed. An accompanying vial of sterile water may be provided as a vehicle to form a suspension prior to administration. Alternatively, ampoules can contain a water soluble salt of the active compound in aqueous solution together with stabilizing agents and, optionally, buffering agents.

Suppositories for rectal administration can be prepared by combining the active ingredient with a neutral fatty base such as cocoa butter.

A particularly valuable embodiment are compositions utilizing pharmaceutically acceptable nontoxic acid addition salts of the above amines. These salts include those derived from both organic and inorganic acids such as for example, hydrochloric, hydrobromic, sulfuric, phosphoric, methane-sulfonic, acetic, lactic, succinic, malic, aconitic, phthalic, tartaric and like acids. It is to be understood that while a salt form, as for example the hydrochloride, is often more convenient than the corresponding free amine for the purpose of formulation and stability of dosage units, the antidepressant properties of the salts are a function of the amine forming the cation thereof.

These 11-aminoalkyl-9,10 - dihydro-9,10 - ethanoanthracenes exist as optical isomers and both the racemate of these isomers and the individual isomers themselves are within the scope of the present invention. The racemate may be separated into its individual isomers through the well known technique of formation of diastereoisomeric salts with optically active acids, such as d- or l-tartaric acid. Similarities in properties are observed with the resolved enantiomorphs, the levorotatory form generally being the more active.

The method of the present invention involves administration of an 11-aminoalkyl-9,10 - dihydro - 9,10 - ethanoanthracene derivative of the defined class in a psychotherapeutic amount for the treatment of mental depression of various origins such as involutive depression, catatonia, manic depression, schizophrenic depression, senile depression and the like. The dose, in all cases, must be adjusted to the condition, age and response of the recipient but generally a response is observed within the daily dosage range of about .6 to about 50 mm./kg. of body weight.

Of particular significance is the fact that certain of these compounds are particularly valuable in the treatment of schizophrenic depression, a condition in which known anti-depressants are generally not used in view of their tendency to aggravate the psychotic profile of the schizophrenia. No such aggravation is observed with compositions utilizing compounds of the above defined class and particularly with compounds of the formula:

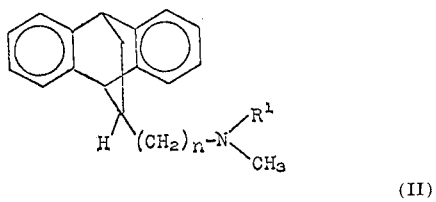

(II)

wherein $n$ is 1, 2 or 3 and $R^1$ is hydrogen or methyl.

The antidepressant properties can be observed quantitatively in a number of tests in models utilizing the laboratory animal. For example, utilizing the reserpine antagonism test of Theobald et al., Arch. int. Pharmacodyn. 148, 565, the following values are obtained for an s.c. dose of 50 mg./kg. given 24 hours prior to a s.c. dose of 2 mg./kg. of reserpine.

Compound:  Resp. antagonism, percent
(A) 11-methylaminomethyl-9-10-dihydro-
  9,10-ethanoanthracene hydrochloride _____ 46
(B) 11-dimethylaminomethyl-9,10-dihydro-
  9,10-ethanoanthracene hydrochloride _____ 62
(C) 11-(2-dimethylaminoethyl)-9,10-dihydro-
  9,10-ethanoanthracene hydrochloride _____ 57

Utilizing a lower dosage, nomely 25 mg./kg., and the i.p. route, the following values are observed when administration is made 30 minutes prior to the s.c. dose of reserpine.

Compound:  Resp. antagonism, percent
A _____ 65
B _____ 50
C _____ 7

The compounds also demonstrate the ability to potentiate norepinephrine, as observed in the method of Theobald et al., ibid. p. 576. In this test, values greater than 1.0 for a dose of 0.6 mg./kg. I.V. correspond to norepinephrine potention, a property characteristic of known anti-depressant agents Compound (0.6 mg./kg. I.V.):  Norepinephrine potentation
A _____ 4.3
B _____ 1.3
C _____ 4.5

In continuing clinical evaluations, the compounds have been shown to be active in treatment of depression, particularly the depressive phase of schizophrenia for which other antidepressants are not effective. Thus, for example, in one study, 11-methylaminomethyl-9,10-dihydro-9,10-ethanoanthracene as the hydrochloride was administered in doses ranging from 50 to 100 mg. orally per day to a group of five patients, four of whom were suffering from schizophrenic depression and one of whom suuffered from endogenous depression. These patients had been previously treated unsuccessfully, both with other antidepressants and with phenothiazines. An improvement was noted in 24 hours after administation of the test compound, indicating an extremely rapid onset of action. A significant improvement was observed in all patients. The only side effect observed was the occurrence of a Parkinson syndrome in a single patient.

In additional studies in which the compound was administered in daily doses up to 200 mg. p.o. or 150 mg. i.m., one out of two patients having schizophrenic depression and one out of two patients having manic depressive psychoses showed significant improvement. Somewhat less favorable results were obtained in one patient having anxious melancholia and two patients having neurotic depressions where no improvement was observed and in the case of five patients having involutive depression where one patient showed improvement. At this dose level, tremor development was the only observed side effect.

In normal humans the compounds appear to have neither subjective nor significant objective effects. In one study on six healthy subjects involving seventy-six separate administrations, 11-methylaminomethyl-9,10-dihydro-9,10-ethanoanthracene as the hydrochloride was given in doses ranging from 20 to 220 mg. Blood studies were completely normal and the only effect observed was one patient complaining of difficulties in urinating, but only at an upper dosage of 200 mg. No analgesia was observed in any patient at any level.

It is to be appreciated that the present description of making and using the invention contained herein represents the best mode currently contemplated and should not be construed as a recommendation or encouragement to employ these compounds in humans without compliance with all rules and regulations promulgated under Title 21 of the United States Code nor without proper professional supervision and careful study of all information which may subsequently become available.

The following examples will serve to further typify the nature of this invention.

EXAMPLE 1

Two hundred and fifty grams of 11-(3'-dimethylaminopropyl) - 9,10-dihydro-9,10-ethanoanthracene hydrochloride are mixed with 175.80 g. of lactose and 169.70 parts of potato starch. The mixture is moistened with an alcoholic solution of 10 g. of stearic acid in about 90 ml. of ethanol and granulated through a sieve. After drying, 160 g. of potato starch, 200 g. of talcum, 2.50 g. of magnesium stearate and 32 g. of colloidal silicon dioxide are mixed therewith and the resulting mixture is pressed into tablets, approximately 10,000, each weighing 100 mg. and containing 25 mg. of active substance. The tablets can be marked with break lines if desired to enable a closer adaption of the dosage to be given.

EXAMPLE 2

A granulate is prepared from 250 g. of 11-methylaminomethyl-9,10-dihydro-9,10-ethanoanthracene hydrochloride, 175.90 g. of lactose and an alcoholic solution of 10 g. of stearic acid. After drying, the granulate is mixed with 56.60 g. of colloidal silicon dioxide, 165 g. of talcum, 20 g. of potato starch and 2.50 g. of magnesium stearate and pressed into approximately 10,000 dragee centers. These are then coated with a concentrated syrup of 502.28 g. of crystallized sucrose, 6 g. of shellac, 10 g. of gum arabic, 0.22 g. of dyestuff and 1.5 g. of titanium dioxide and dried. The dragees obtained each weigh 120 mg. and contain 25 mg. of active substance.

EXAMPLE 3

A solution of 1.25 g. of 11-methylaminomethyl-9,10-dihydro-9,10-ethanoanthracene, 0.10 g. of ascorbic acid, 0.05 g. of sodium bisulfite and 0.10 g. of sodium sulfite is prepared in distilled water to a volume of 100 ml. This solution is used to fill ampoules, each containing 2 ml. folume and 25 mg. of active substance. The ampoules are heat sterilized in an autoclave.

EXAMPLE 4

Manufacturing instructions for tablets containing 25 mg. of active substance.

Ingredient: Amount (A)

| | |
|---|---|
| 11 - methylaminomethyl - 9,10 - dihydro-9,10-ethanoanthracene hydrochloride _____g__ | 250.0 |
| Lactose _____g__ | 175.8 |
| Potato starch _____g__ | 169.7 |

(B)

| | |
|---|---|
| Stearic acid _____g__ | 10.0 |
| Ethanol _____ml__ | 90 |

(C)

| | |
|---|---|
| Potato starch _____g__ | 160.0 |
| Talcum _____g__ | 200.0 |
| Magnesium stearate _____g__ | 2.5 |
| Colloidal silicon oxide _____g__ | 32.0 |

The ingredients listed under A are mixed well and moistened with the granulating solution B. The granulated mass is passed through a sieve having a 49–64 meshes/cm.$^2$. The moist granulate is then dried for about 12 hours at about 20°. The dried granulate is again passed through a sieve of the same mesh number and intimately mixed with the ingredients listed under C. The resulting mass is then pressed into tablets of 100 mg. each, containing 25 mg. of active ingredient.

EXAMPLE 5

Manufacturing instructions for the production of coated tablets (dragées) containing 25 mg. of the active substance each.

Ingredient: Amount (A)

| | |
|---|---|
| 11-[N' - (2 - hydroxyethyl)-piperazinomethyl]-9,10-dihydro-9,10-ethanoanthracene hydrochloride _____g__ | 250.0 |
| Lactose _____g__ | 175.9 |

(B)

| | |
|---|---|
| Stearic acid _____g__ | 10.0 |
| Ethanol _____ml__ | 90 |

(C)

| | |
|---|---|
| Potato starch _____g__ | 20.0 |
| Talcum _____g__ | 165.0 |
| Magnesium stearate _____g__ | 2.5 |
| Colloidal silicon oxide _____g__ | 56.6 |

The ingredients listed under A are mixed well and moistened with the granulating solution B. The moistened mass is granulated through a sieve having 49–64 meshes/cm.$^2$. The moist granulate is then dried for about 12 hours at about 20° and then passed again through a sieve of the same mesh number. The dried granulate is then intimately mixed with the ingredients listed under C and the resulting mass is compressed into cores of a weight of 68 mg. each, containing 25 mg. of active ingredient.

The production of the dragees is then completed in a conventional manner by applying a conventional coating solution to the cores. In this manner, dragees having each a total weight (cores plus coating) of about 100 mg. and containing 25 mg. of active substance are obtained.

Similarly the following compounds may be utilized in the same amount as the active ingredient in the above formulation:

11-methyaminomethyl-9,10-dihydro-9,10-ethano-
    anthracene hydrochloride
11-(2-methylaminoethyl)-9,10-dihydro-9,10-ethano-
    anthracene hydrochloride
11-(3-methylaminopropyl)-9,10-dihydro-9,10-ethano-
    anthracene hydrochloride
11-dimethylaminomethyl-9,10-dihydro-9,10-ethano-
    anthracene hydrochloride
11-(2-dimethhylaminoethyl)-9,10-dihydro-9,10-ethano-
    anthracene hydrochloride
and 11-(3-dimethylaminopropyl)-9,10-dihydro-9,10-
    ethanoanthracene hydrochloride.

EXAMPLE 6

Ingredient: Amount

| | |
|---|---|
| 11 - methylaminomethyl - 9,10 - dihydro-9,10-ethanoanthracene _____g__ | 1.25 |
| Sodium bisulfite _____g__ | 0.1 |
| Glycerol _____g__ | 2.0 |
| Distilled water _____ml__ | 100 |

The active substance and the sodium bisulfite are dissolved in about 90 ml. of distilled water. The glycerol is then added with the volume of the preparation filled up to 100 ml. with distilled water. The solution is then filtered and filled into ampoules of 2 ml. each.

These ampoules, each of which contains 25 mg. of active substance in a 1.25% (weight/volume) solution, are then sterilized at 120° C. during 20 minutes and are suitable for use as injectable solutions.

Instead of sodium bisulfite, the same amount of cysteine can be used. The preparation of injection solutions with these substances is advantageously carried out under aseptic conditions in diffuse daylight and the steam sterilization can be replaced by sterilization by filtration.

Similarly, injection solutions are obtained by replacing the active substance used in the above example by the same amount of 11 - (1'-dimethylaminoethyl)-9,10-dihydro-9,10-enthanoanthracene.

EXAMPLE 7

Ingredient: Amount, g.

| | |
|---|---|
| 11 - [N' - (2-hydroxyethyl)piperazinomethyl]-9,10-dihydro-9,10-ethanoanthracene __ | 0.0250 |
| Butylated hydroxytoluene _____ | 0.0002 |
| Paraffin (hard) _____ | 0.0200 |
| Paraffin oil _____ | 0.5348 |

The active substance and the paraffin are suspended in paraffin oil, as inert carrier, and butylated hydroxytoluene is added. The resulting liquid paste is then introduced under sterile conditions into the soft gelatin capsules.

Similarly, gelatin capsules are obtained by replacing of active substance used in the above example by the same amount of 11-methylaminomethyl - 9,10-dihydro-9,10-ethanoanthracene hydrochloride.

EXAMPLE 8

Ingredient: Quantity/capsule, mg.

| | |
|---|---|
| 11-(3'-methylaminoethyl - 9,10 - dihydro-9,10-ethanoanthracene hydrochloride _____ | 250 |
| Lactose _____ | 150 |
| Magnesium stearate _____ | 3 |

The foregoing ingredients are mixed and introduced into a two piece No. 2 hard gelatin capsule.

EXAMPLE 9

| Ingredient: | Quantity/capsule, mg. |
|---|---|
| 4 - chloro-11-methylaminomethyl-9,10-dihydro-9,10-ethanoanthracene hydrochloride | 500 |
| Lactose | 80 |
| Corn starch | 70 |
| Soluble starch | 15 |
| Magnesium stearate | 5 |

The first three ingredients are thoroughly mixed and granulated with a solution of the soluble starch. This granulate is dried, mixed with the magnesium stearate and presesd into tablet cores which are coated as with sugar.

What is claimed:

1. The method of treating mental depression which comprises administering to a depressed individual an antidepressant effective amount of a compound of the formula:

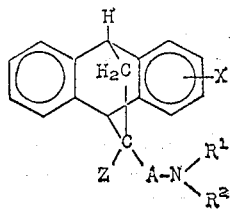

wherein
X is hydrogen, chloro, methoxy, methylthio or trifluoro-methyl;
Z is hydrogen or methyl;
A is a straight or branched alkylene chain of from 1 to 5 carbon atoms; and
each of $R^1$ and $R^2$, taken separately is hydrogen or (lower)alkyl or $R^1$ and $R^2$, taken collectively together with the nitrogen atom to which they are attached, are pyrrolidino, piperidino, piperazino, N-(lower)alkylpiperazino, N - [hydroxy(lower)alkyl] piperazino or N - [(lower)alkoxy(lower)alkyl]piperazino,
or a pharmaceutically acceptable nontoxic acid addition salt thereof.

2. The method of claim 1 wherein each of X and Z is methyl, $R^1$ is hydrogen or methyl, $R^2$ is methyl, and A is methylene, dimethylene or trimethylene.

3. The method of claim 2 wherein $R^1$ is hydrogen and A is methylene.

4. The method of claim 2 wherein $R^1$ is hydrogen and A is ethylene.

5. The method of claim 2 wherein $R^1$ is hydrogen and A is trimethylene.

6. The method of claim 2 wherein $R^1$ is methyl and A is methylene.

7. The method of claim 2 wherein $R^1$ is methyl and A is ethylene.

8. The method of claim 2 wherein $R^1$ is methyl and A is trimethylene.

9. A pharmaceutical composition for the treatment of depression comprising in unit dosage form a pharmaceutical carrier and an antidepressantly active amount of a compound of the formula:

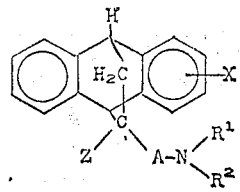

wherein
X is hydrogen, chloro, methoxy, methylthio or trifluoromethyl;
Z is hydrogen or methyl;
A is a straight or branched alkylene chain of from 1 to 5 carbon atoms; and
each of $R^1$ and $R^2$, taken separately is hydrogen or (lower)alkyl or $R^1$ and $R^2$, taken collectively together with the nitrogen atom to which they are attached, are pyrrolidino, piperidino, piperazino, N-(lower)alkylpiperazino, N - [hydroxy(lower)alkyl] piperazino or N-[(lower)alkoxy-alkoxy(lower)alkyl] piperazino,
or a pharmaceutically acceptable nontoxic acid addition sal thereof.

10. A pharmaceutical composition according to claim 6 wherein each of X and Z is hydrogen, $R^1$ is hydrogen or methyl, $R^2$ is methyl, and A is methylene, dimethylene or trimethylene.

11. A pharmaceutical composition according to claim 10 wherein $R^1$ is hydrogen and A is methylene.

12. A pharmaceutical composition according to claim 10 wherein $R^1$ is hydrogen and A is ethylene.

13. A pharmaceutical composition according to claim 10 wherein $R^1$ is hydrogen and A is trimethylene.

14. A pharmaceutical composition according to claim 10 wherein $R^1$ is methyl and A is methylene.

15. A pharmaceutical composition according to claim 10 wherein $R^1$ is methyl and A is ethylene.

16. A pharmaceutical composition according to claim 10 wherein $R^1$ is methyl and A is trimethylene.

No references cited.

ALBERT T. MEYERS, Primary Examiner

S. J. FRIEDMAN, Assistant Examiner

U.S. Cl. X.R.

424—250, 267, 274